United States Patent
Chu et al.

[15] 3,652,324
[45] Mar. 28, 1972

[54] METHOD OF VAPOR DEPOSITING A LAYER OF SI₃N₄ ON A SILICON BASE

[72] Inventors: Ting L. Chu, Dallas, Tex.; Gilbert A. Gruber; John R. Szedon, both of Pittsburgh, Pa.

[73] Assignee: Westinghouse Electric Corporation, Pittsburgh, Pa.

[22] Filed: Aug. 15, 1968

[21] Appl. No.: 752,849

Related U.S. Application Data

[63] Continuation-in-part of Ser. No. 616,695, Feb. 16, 1967, abandoned.

[52] U.S. Cl. ................................... 117/106, 156/17, 117/69
[51] Int. Cl. ................................... C23c 11/08, C23c 11/16
[58] Field of Search ........................... 156/3, 17; 117/106, 69

[56] References Cited

UNITED STATES PATENTS 3,385,729  5/1968  Larchian ............................. 117/200
3,422,321  1/1969  Tombs ................................. 317/235

FOREIGN PATENTS OR APPLICATIONS 1,190,308  3/1959  France ................................. 117/106
1,006,803  10/1965  Great Britain .................. 117/DIG. 12

OTHER PUBLICATIONS

Chem. Abstracts 1965 Vol. 63, Col. 1321 and 1322, Semiconductor Device, Bell Tel. Mfg. Co.

*Primary Examiner*—J. Steinberg
*Attorney*—F. Shapoe, C. Menzemer and G. H. Telfer

[57] ABSTRACT

The present invention relates to dielectric coatings for electronic devices such as rectifiers, transistors and capacitors. More specifically, the invention relates to dielectric coatings comprising silicon nitride films alone or in combination with silicon dioxide films, and to methods for the production of silicon nitride coatings by reacting silane, silicon halides or halosilanes with ammonia.

8 Claims, 15 Drawing Figures

FIG.I.
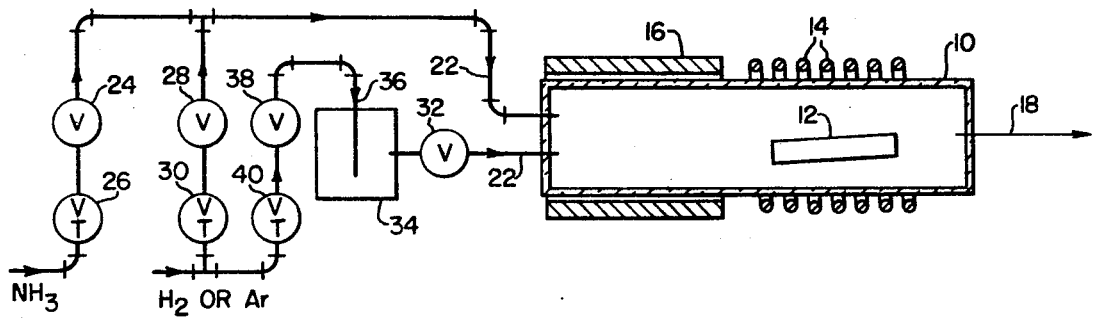
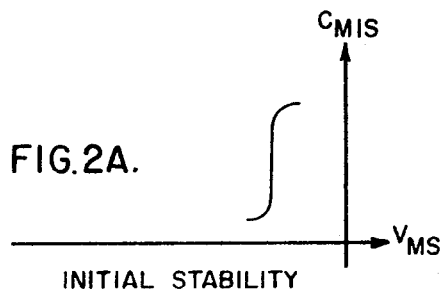
FIG.2A. INITIAL STABILITY
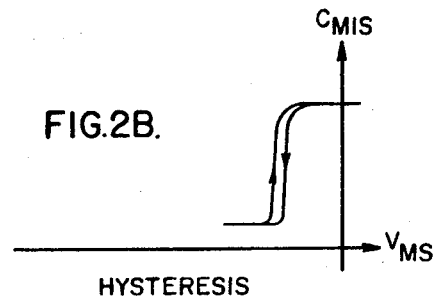
FIG.2B. HYSTERESIS
FIG.2C. CHARGE TRANSFER PRODUCED DISPLACEMENT
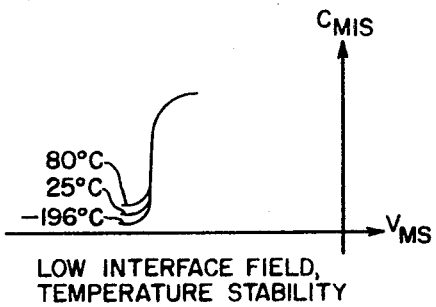
FIG.2D. LOW INTERFACE FIELD, TEMPERATURE STABILITY
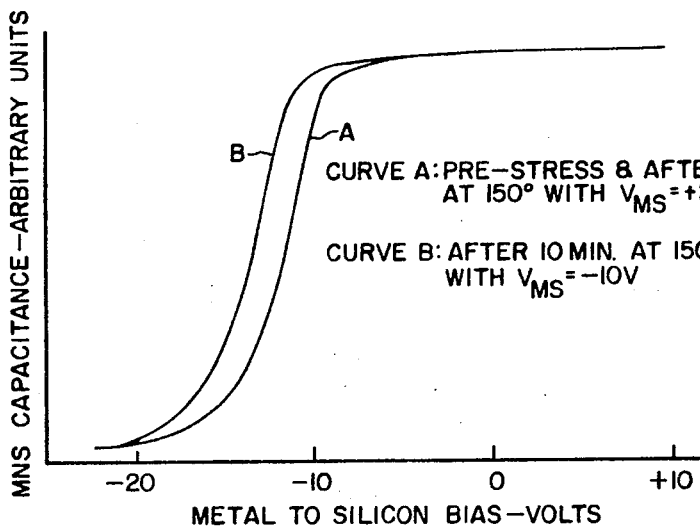
CURVE A: PRE-STRESS & AFTER 10 MIN. AT 150° WITH $V_{MS}=+20V$
CURVE B: AFTER 10 MIN. AT 150°C WITH $V_{MS}=-10V$
FIG.3.

A METHOD OF VAPOR DEPOSITING A LAYER OF SI N ON A SILICON BASE

CROSS-REFERENCE TO RELATED APPLICATION

This application is a continuation-in-part of copending application Ser. No. 616,695, filed Feb. 16, 1967 now abandoned.

BACKGROUND OF THE INVENTION

1. Field of the Invention

This invention is related to dielectric layers, and methods for their preparation, such as for electronic devices including semiconductor devices and integrated circuits.

2. Brief Description of the Prior Art

As is known, silicon dioxide films have been used extensively in semiconductor technology for such applications as surface passivation of semiconductor devices and fabrication of surface-controlled field effect devices, primarily because they are easy to produce. Although silicon dioxide is satisfactory in many applications, it is not an entirely ideal material for semiconductor and other device purposes because of its low resistance to radiation, strong affinity toward water, and high permeability to water vapor and other impurities.

For example, in space applications, silicon dioxide dielectric coatings for semiconductors are subjected to various radiation environments such as high energy protons, neutrons, electrons and gamma rays. Such radiation produces ionization, resulting in the production of undesirable hole-electron pairs. In the main semiconductor body itself, the ionization effects disappear within a short time after the irradiation ceases, and their magnitude depends upon the dose rate of the irradiation. Hence, in the semiconductor body itself, ionizing radiation effects are considered to be transient and relatively unimportant. On the other hand, ionization effects due to radiation in silicon dioxide films produce hole-electron pairs which do not recombine readily, meaning that one or both of the carriers can be trapped in the film to yield space charges in the insulator.

A variety of other insulating materials have been proposed for use as layers on semiconductor devices besides silicon dioxide. Such materials include other oxides as well as nitrides of various materials. For example, in co-pending application Ser. No. 632,829, filed Apr. 21, 1967, a continuation of application Ser. No. 362,733, filed Apr. 27, 1964, now abandoned, assigned to the assignee of the present invention, there are disclosed layers of aluminum oxide, titanium oxide, beryllium oxide, zirconium oxide, aluminum nitride and silicon nitride for use in semiconductor device applications. Improvement is sought in the nature and properties of insulating layers for use on semiconductors and ineffective, economical methods for their preparation.

SUMMARY OF THE INVENTION

It is an object of the invention to provide new and improved dielectric coatings for semiconductors and other similar devices, which coatings overcome the above and other disadvantages of silicon dioxide coatings. Another object of the invention is to provide a method for effectively forming silicon nitride films on a substrate such that the films will have adequate chemical, mechanical and electrical properties. Still another object of the invention is to provide dielectric coatings comprising successive layers of silicon dioxide and silicon nitride, or a mixture of silicon dioxide and silicon nitride.

In accordance with the invention, it has been found that a conventional silicon dioxide dielectric layer can be advantageously replaced by a layer of silicon nitride deposited directly on a semiconductor or the like substrate, or by a silicon nitride dielectric layer deposited over a previously deposited silicon dioxide layer. Silicon nitride is an inert refractory material, similar to steel in imperviousness, tensile strength, and thermal conductivity, similar to ceramic in electrical resistivity and oxidation resistance, and similar to sapphire in hardness. Hence it is basically a useful dielectric material.

As will be seen, the silicon nitride films are superior to silicon dioxide films in chemical, electrical and mechanical properties. Furthermore, the silicon-silicon nitride system is more desirable for semiconductor device purposes than the silicon-silicon dioxide system since the former is more stable under voltage bias to high temperatures and under conditions involving ionization radiation.

Silicon nitride dielectric films do, however, have one disadvantage in that the silicon-silicon nitride structure exhibits some charge instability and positive interface charges. Accordingly, if desired, the silicon nitride film can be deposited over a previously formed silicon dioxide film, or a more or less homogeneous mixture of silicon dioxide and silicon nitride can be applied as a film over a previously formed silicon dioxide film. In this manner, the desirable characteristics of the silicon nitride film are retained and, at the same time, the silicon dioxide serves to moderate or reduce the charge instability and interface charge characteristics of the silicon nitride layer by itself.

Further, and in accordance with the invention, it has been found that silicon nitride films can be formed effectively on a substrate by the ammonolysis of silicon halides or the pyrolysis of silane or halosilanes in ammonia. In this process, it is essential that the chemical reactions, at least the final step yielding silicon nitride, should take place predominantly on the substrate surface in order to produce adhering films. A low partial pressure of the silicon compound in the reactant mixture and high linear velocity of the reactant mixture over the substrate surface are essential. Furthermore, the in situ treatment of the substrate prior to the deposition process can influence the characteristics of the silicon-silicon nitride structures, and the cleanliness of the substrate surface is of extreme importance.

BRIEF DESCRIPTION OF THE DRAWING

The above and other objects and features of the invention will become apparent from the following detailed description wherein illustrative examples of the invention are presented, and wherein:

FIG. 1 is a schematic diagram illustrating the apparatus used for the deposition of silicon nitride films;

FIGS. 2A–2D are capacitance-voltage graphs illustrating the initial stability, hysteresis, charge transfer produced displacement and low interface field temperature stability of aluminum-silicon nitride-silicon structures;

FIG. 3 is a graph illustrating the effect of temperature-voltage stress of plus 20 volts and minus 10 volts at 150° C. on the capacitance of metal-silicon nitride-silicon structures;

DESCRIPTION OF PREFERRED EMBODIMENTS

Figure 4A:
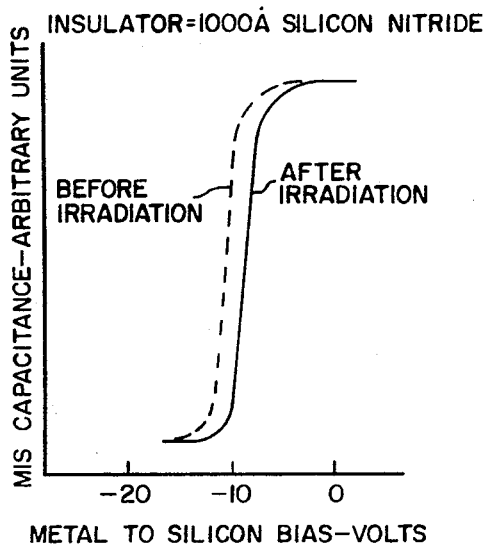
FIG. 4A is a graph illustrating the effect of a dose of 10 kev. electrons on the capacitance-voltage characteristics of a metal-silicon nitride-silicon structure shorted during irradiation, using a primary electron flux of approximately $10^{-5}$ coul per square centimeter.

Silicon nitride can be prepared by the nitridation of silicon with nitrogen or ammonia, the reaction of silicon tetrachloride with ammonia or nitrogen-hydrogen mixtures, or by the reaction of silane with ammonia or nitrogen. All of these reactions are thermodynamically feasible; however the reaction of silicon with nitrogen or ammonia yields crystalline nitride and, therefore, is unsatisfactory for semiconductor or capacitor device purposes. The reactions of silane or silicon tetrachloride with ammonia are more favorable than those with nitrogen due to the higher free energy formation of ammonia at temperatures above 500° K. Consequently, it is preferable to form silicon nitride films on substrates by the reaction of silicon tetrachloride or silane with ammonia. These reactions may be represented by the following equations:

$$3\ SiCl_4(g.) + 4\ NH_3(g.) \rightarrow Si_3N_4(s) + 12\ HCl\ (g.)$$
$$3\ SiH_4(g.) + 4\ NH_3(g.) \rightarrow Si_3N_4(s) + 12\ H_2(g.)$$

In either case, the silicon nitride is deposited on the surface of the substrate while the HCl or hydrogen, being a gas, simply passes on.

While the examples shown herein utilize silicon tetrachloride as the source of silicon, it should be understood that any of the other silicon halides can be used in its place, such as $SiBr_4$, $SiI_4$ or $SiF_4$. Likewise, halosilanes such as $SiHBr_3$ may be employed as a substitute for silane.

As was mentioned above, it is essential that the chemical reactions, at least the final step yielding silicon nitride, should take place predominantly on the substrate surface in order to produce adherent films. If an attempt is made to form silicon nitride in the gas-phase by volume reactions, followed by the deposition on the substrate surface, the resulting film is non-adherent. Conditions must, therefore, be adjusted to minimize the volume reactions. In particular, a low partial pressure of the silicon compound in the reactant mixture and a high linear velocity of the reactant mixture over the substrate surface are essential.

DEPOSITION OF SILICON NITRIDE FILMS BY THE AMMONOLYSIS OF SILICON TETRACHLORIDE

As an illustrative example of the invention, the deposition of silicon nitride films by the ammonolysis of silicon tetrachloride can be carried out in an apparatus shown schematically in FIG. 1. A horizontal fused silica tube 10 of about 45 millimeters internal diameter and three feet in length is used as the reaction tube. N-type single crystal silicon wafers of [111] orientation and 50 ohm-centimeter resistivity, for example, are supported on a silicon or silicon coated graphite susceptor 12 in the quartz tube, and the susceptor heated externally by a radio frequency coil 14 and/or a resistance heater 16.

As shown in FIG. 1, the tube 10 is provided with an exhaust tube 18 and a pair of inlet tubes 20 and 22. Tube 20 is connected through a shut-off valve 24 and metering valve 26 to a source of ammonia; and is also connected through shut-off valve 28 and metering valve 30 to a source of hydrogen or argon. The inlet tube 22, on the other hand, is connected through valve 32 to a container 34 containing silicon tetrachloride. Depending downwardly into the container 34 is a conduit 36 connected through shut-off valve 38 and metering valve 40 to a source of hydrogen or argon. As will be appreciated, by adjusting the various valves 24, 28, 32 and 38, ammonia and silicon tetrachloride can be introduced into the reaction tube 10 along with hydrogen or argon used as a carrier gas, the expended gases being discharged through the exhaust tube 18.

The wafers, prior to insertion into the tube 10, are lapped and pre-etched in the conventional manner. As mentioned above, the in situ treatment of the substrate prior to the deposition process and the cleanliness of the substrate surface are of extreme importance. Preferably, the in situ treatment comprises chemical etching with oxygen at a temperature in the range of about 1,000° to 1250° C. and preferably 1,200° to 1250° C. The chemical etching process is carried out with hydrogen used to provide an inert atmosphere for the oxygen. A mixture of oxygen and hydrogen in the ratio of about ten thousand parts hydrogen to one part oxygen is passed through the silica tube by means, not shown in FIG. 1, and the substrate heated to a temperature in the range of about 1,000° to 1250° C. The in situ oxygen etch is carried out for about 20 to 30 minutes.

Following the etching technique, silicon tetrachloride and ammonia are introduced separately into the reaction tube since they react instantaneously at room temperature. During the deposition process, the wall of the reaction tube is maintained at about 375° C. to eliminate the condensation of ammonium chloride. However, the reaction tube is at a sufficiently low temperature at which the deposition of silicon nitride is negligible. During deposition, the substrate is maintained in the temperature range of about 650° to 1300° C. In a more preferred temperature range, 800° to 1,000° C., films of desired thicknesses can be produced in conveniently short times without undue thermal effects in a semiconductor substrate. At temperatures substantially above 1,200° C. the deposition rate decreases rapidly due to the contribution of gas-phase reactions, and the deposited film has many inclusions. The deposition of silicon nitride is affected by the flow rate of ammonia and the composition of the reactant mixture. This is shown, for example, in Tables I and II:

TABLE I

Deposition Rate of $Si_3N_4$ as a Function of the

Flow Rate of $NH_3$ (Substrate Temperature, 1,200° C.)*

| Flow Rate of $NH_3$, l./min. | Average Deposition Rate, $\mu$/min. |
| --- | --- |
| 16 | 0.8 |
| 12 | 0.95 |
| 6 | 1 |
| 2 | 0.7 |

*Flow rate of $SiCl_4 = 1.5 \times 10^{-3}$ mol/min.

TABLE II

Deposition Rate of $Si_3N_4$ as a Function of the

Reactant Composition (Substrate Temperature, 1,200° C.)*

| $SiCl_4/NH_3$ Molar Ratio | Deposition Rate, $\mu$/min. |
| --- | --- |
| $1.2 \times 10^{-3}$ | 0.5 |
| $3.0 \times 10^{-3}$ | 0.65 |
| $6.0 \times 10^{-3}$ | 1 |
| $1.2 \times 10^{-2}$ | 1.75 |

*Flow rate of $NH_3 = 6$ l./min.

From Table I, it can be seen that at a substrate temperature of 1200° C. and a flow rate of silicon tetrachloride equal to $1.5 \times 10^{-3}$ mols per minute, the deposition rate increases from 0.7 micron per minute at a flow rate of 2 liters of ammonia per minute to 1 micron per minute at a flow rate of ammonia equal to 6 liters per minute. Above a flow rate of 12 liters per minute, however, the deposition rate begins to drop. Hence, the most advantageous flow rate of ammonia under the conditions described with a reaction tube of 45 millimeters internal diameter, is 6 to 12 liters per minute. Regardless of the size of the reaction tube, the linear velocity of the mixture of gases over the substrate at room temperature should be at least 8 centimeters per second to achieve uniform deposition of the silicon nitride films on the substrate surface.

From Table II, it can be seen that as the molar ratio of silicon tetrachloride to ammonia increases, the deposition rate, in microns per minute, also increases under an optimum flow rate of ammonia equal to 6 liters per minute. However, even though the deposition rate will increase with increasing amounts of the silicon compound, the partial pressure of silicon tetrachloride, as a percentage of the total gas pressure of the mixture, should not exceed 1 percent if films of adequate quality are to be achieved.

DEPOSITION OF SILICON NITRIDE FILMS BY THE PYROLYSIS OF SILANE

As another example of the invention, silicon nitride films can be deposited, for example, on N-type single crystal silicon wafers of [111] orientation and 10–50 ohm-centimeter resistivity in a horizontal fused silica tube of 55 millimeters internal diameter of the type described above in connection with FIG. 1. As was the case above, the wafers must be lapped and pre-etched and thereafter etched in situ by means of oxygen in the manner described above.

Since silane is inert toward ammonia at room temperature, the two gases are introduced simultaneously into the reaction tube. Adherent silicon nitride films are deposited on the silicon substrate by this process under a variety of conditions. Here, again, the velocity of the mixture of gases over the substrate surface must be at least 8 centimeters per second as was the case with silicon tetrachloride and ammonia.

Tables III and IV illustrate various conditions under which silicon nitride films can be grown by the reaction of silane with ammonia:

TABLE III

Deposition Rate of $Si_3N_4$ as a Function of Substrate Temperature*

| Substrate Temp., °C. | Deposition Rate, A./min. |
| --- | --- |
| 750 | 100 |
| 850 | 220 |
| 950 | 300 |
| 1,050 | 330 |
| 1,150 | 380 |

*Flow rate of $NH_3$ = 20 l./min.; flow rate of $SiH_4$ = 2 m l./min.

TABLE IV

Deposition Rate of $Si_3N_4$ as a Function of the Flow Rate of $SiH_4$ (Substrate Temperature, 850° C.)*

| Flow Rate of $SiH_4$ m l./min. | Deposition Rate, A./min. |
| --- | --- |
| 0.5 | 60 |
| 1.0 | 100 |
| 2.0 | 220 |
| 5.0 | 500 |

*Flow rate of $NH_3$ = 20 l./min.

In Table III, it can be seen that under the given conditions of reactant composition and flow rate, the deposition rate of silicon nitride increases with increasing substrate temperature. Generally speaking, the deposition of silicon nitride in this manner can be accomplished over a wide temperature range of about 650° to 1300° C. In a more preferred temperature range, 800° to 1,000° C., films of desired thicknesses can be produced in conveniently short times without undue thermal effects in a semiconductor substrate. Table IV shows the deposition rate of silicon nitride films as a function of the reactant composition with gradually increasing flow rates of silane; and it can be seen that as the flow rate of silane increases with a fixed flow rate of ammonia, the deposition rate of the silicon nitride film increases in much the same way as is the case in Table II for gradually increasing amounts of silicon tetrachloride. Again, the partial pressure of silane as a percentage of the total gas pressure of the mixture of gases should not exceed 1 percent.

From the foregoing, it will be appreciated that the critical parameters for the successful formation of silicon nitride films on a substrate, using either silicon tetrachloride or silane, are as follows:

1. The substrate temperature during deposition of silicon nitride should be in the range of 650° to 1,300° C. and preferably 800° to 1,000° C. In the preferred range, the films have optimized properties such as density and dissolution rate in an etchant.

2. The mixture of the silicon compound gas and ammonia must flow over the substrate surface at a velocity of at least 8 centimeters per second.

3. The partial pressure of the silicon compound gas must not be greater than 1 percent of the total gas pressure of the mixture of the silicon compound gas with ammonia.

PHYSICAL PROPERTIES OF SILICON NITRIDE FILMS

Under proper conditions, silicon nitride films deposited on silicon substrates by the ammonolysis of silicon tetrachloride or the pyrolysis of silane and ammonia are uniform, transparent and highly adherent to the substrate. However, films thicker than about 0.8 micron sometimes crack. At still larger thicknesses, about 1.0 micron and above, the substrate is appreciably warped and becomes concave upward. This is due to the larger thermal expansion coefficient and greater mechanical strength of the silicon nitride film. In spite of the differences in thermal expansion coefficients of silicon and silicon nitride, no dislocations in the substrate are produced, providing that the thickness of the silicon nitride film is 0.8 micron or less. Usually, a considerably thinner film is required for semiconductor devices. Silicon nitride films have been found to be amorphous by electron diffraction examinations.

The temperature of the substrate during the deposition process has a decided effect on practically all of the physical properties of the resulting silicon nitride film. As the temperature is increased from 750° to 1,300° C., for example, the deposition rate increases rapidly. At the same time, the dissolution rate of the film in 49 percent hydrofluoric acid decreases drastically. At the substrate temperatures above 1200° C, the contribution of the gas-phase reaction becomes important, and the quality of the deposited film deteriorates. The lower limiting temperature, on the other hand, is determined by the rate of chemical reaction on the substrate surface.

Likewise, the density of the silicon nitride film increases with increasing substrate temperatures. For example, a film deposited at 850° C. has a density of 2.78 grams per cubic centimeter, a film deposited at 950° C. has a density of 2.82 grams per cubic centimeter, and a film deposited at 1,110° C. has a density of 2.92 grams per cubic centimeter. As can be appreciated, the dissolution rate in hydrofluoric acid decreases with increasing temperatures of deposition and correspondingly increasing densities of the silicon nitride film.

Since silicon nitride film deposited at 800° C. to 900° C., for example, may be subjected to higher temperatures during device fabrication processes, and the effects of high temperature annealing on their properties are of importance. In general, the annealing process provides the thermal energy by which atoms in the bulk material can re-align themselves to configurations of lowest free energy; and changes in density, structure and the like are possible. The residual stresses in the material can also be removed by annealing.

The annealing of silicon nitride films has been carried out in a fused silica tube at 1,200° C. for 4 hours in a nitrogen atmosphere with the flow rate of the nitrogen being 0.2 liter per minute. The rate of heating and cooling was 5° C. per minute. The dissolution rate of silicon nitride films in 49 percent hydrofluoric acid will decrease after annealing; and this decrease is more pronounced in films deposited at lower temperatures. For example, the dissolution rate of films prepared at 800° C. decreased from 700 Angstrom units per minute to 260 Angstrom units per minute. However, films prepared at a substrate temperature of 1,100° C. show no appreciable change in dissolution rate after annealing.

Amorphous silicon nitride is structurally more compact than silicon dioxide, as indicated by its higher density. The diffusivities of dopants in silicon nitride are, therefore, lower than those in silicon dioxide. Furthermore, the activation energies of dopant diffusion in silicon nitride are very high because of its refractory nature. Thus, silicon nitride is useful as a mask against the diffusion of dopants into silicon.

Experiments have been carried out to determine the masking ability of silicon nitride films. In these experiments, the silicon nitride films were deposited on silicon substrates at 900° C. The film was removed completely from selected areas of the specimen by masking and etching techniques. In boron diffusion experiments, the silicon substrates were N-type, 20–50 ohm-centimeter resistivity, and boron tribromide was used as the source in a two-step diffusion process. During the first step, boron oxide glass was deposited on the specimen surface at 1,100° C. for an hour, and a diffused layer of about 3 microns deep with a surface concentration of $10^{20}$ atoms per cubic centimeter was formed in the unmasked regions of the specimen. The boron oxide glass was then removed by using aqueous hydrofluoric acid, and during the second step of diffusion or "drive-in," this diffused layer served as the source. The masking ability of silicon nitride is independent of the "-drive-in" step if the nitride film is not attacked during the first step and the boron oxide glass is completely removed. The specimens were angle-lapped and stained with hydrofluoric acid after each step to determine if boron had diffused through the nitride film. It was found that where a nitride film of 500 Angstrom units was used in the masked regions, essentially no boron was diffused through the mask.

P-type silicon substrates of 10–20 ohm-centimeter resistivity with nitride films of about 1,300 Angstrom units thickness were used for phosphorus diffusion. Phosphorus oxychloride was used as the diffusion source, and a duffused layer of 3 microns thickness, with a surface concentration of about $10^{21}$ atoms per cubic centimeter, was found in unmasked regions at 1,100° C. after 1 hour. The nitride film was also found to be an effective mask against the diffusion of phosphorus into silicon.

In summary, silicon nitride is a more effective diffusion mask than silicon dioxide under conditions where silicon nitride is chemically inert. This is due predominantly to the more compact structure of silicon nitride resulting in lower diffusivity of the dopants in it.

ELECTRICAL PROPERTIES OF SILICON-SILICON NITRIDE STRUCTURES

The capacitance-voltage behavior of MNS structures (metal-silicon nitride-silicon) has been determined under various conditions. The MNS structures were found to exhibit a class of charge instability not observed in metal-silicon dioxide-silicon structures. FIGS. 2A-2D illustrate the capacitance-voltage characteristics of metal-silicon nitride-silicon (MNS) capacitors at a high frequency of 100 kilocycles. The capacitors consisted of 0.1 to 0.15 micron silicon nitride films deposited on 50 ohm-centimeter N-type silicon at 800° to 1,200° C., using the pyrolysis of silane and ammonia. Irrespective of the in situ treatment of the substrate surface before deposition and the substrate temperature during deposition, these capacitors exhibit a class of charge instability not observed in metal-silicon dioxide-silicon structures.

In FIGS. 2A–2D, and for purposes of discussion, the flat-band voltage is that voltage for which the transition between high and low capacitance occurs. For applied bias within several volts of the flat-band value, the latter is moderately low, about 5 volts, and the capacitance-voltage curve is stable with negligible hysteresis. This is shown, for example, in FIG. 2A. However, as the negative bias is increased, to about −10 volts, hysteresis of the order of a few tenths of a volt is observed as shown in FIG. 2B. As the negative bias is further increased to several times the flat-band voltage, to about −30 volts, the capacitance-voltage curve shifts by several volts to more negative values of voltage and the hysteresis is also increased to a few volts as shown in FIG. 2C. The direction of this shift is opposite to that which would occur due to ion migration effects. This shift can be explained by charge interchange across the nitride-silicon interface. One possible mechanism is tunneling between states in the nitride or at the interface and the silicon itself. With large negative bias, electrons could tunnel from the insulator to the silicon or holes could tunnel in the opposite direction. In either case, the silicon nitride would have an excess positive charge. In spite of the shift of the capacitance-voltage curve at large negative bias, the capacitance-voltage curve is stable over a wide temperature range if the voltage excursion about the new flat-band value is small as shown in FIG. 2D where results for temperatures of 80° C., 25° C., and −196° C. are illustrated.

It is well known that the metal-silicon dioxide-silicon (MOS) structures are frequently unstable under voltage-temperature stress due to ion migration in the oxide film. The stability of the silicon nitride films or the absence of ion migration is shown, for example, in the graph of FIG. 3. MNS structures were subjected to bias stress at 150° C. Curve A of FIG. 3 represents the capacitance-voltage relation for an MNS structure with 1,300 Angstrom units of nitride film, measured in the laboratory ambient at a high frequency of 100 kilocycles. After a plus 20 volts bias is applied to the structure at 150° C. for one hour and during the cooling cycle, no detectable shift in the capacitance-voltage relation is observed as illustrated by curve A in FIG. 3. In an MOS structure employing a silicon dioxide layer, the flat-band voltage would have displaced toward more negative values by as much as 60 volts under similar positive bias-temperature stress due to ion migration in the oxide. When a minus 10 volts bias is applied to the MNS structure at 150° C for 1 hour, the capacitance-voltage curve B shifts to the left by about 2 volts, due to positive charging of interface states. Therefore, MNS structures are stable under voltage temperature stress, and ion migration in silicon nitride is negligible under the conditions used.

Figure 4B:
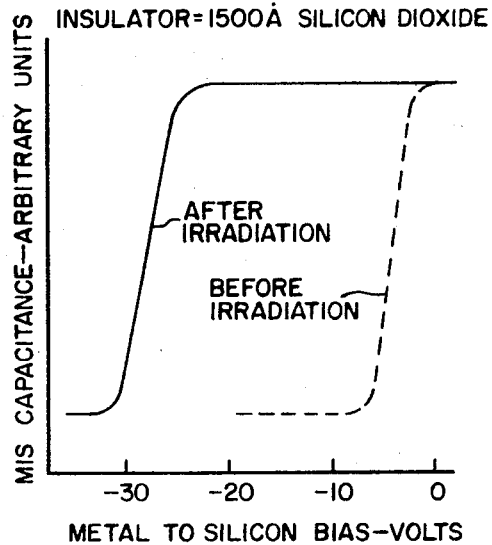
FIG. 4B is a graph illustrating the effect of a dose of 10 kev. electrons on the capacitance-voltage characteristics of a metal-silicon dioxide-silicon structure shorted during irradiation, also using a primary electron flux of approximately $10^{-5}$ coul per square centimeter.

FIGS. 4A and 4B are plots of capacitance versus metal to silicon bias for silicon nitride and silicon dioxide layers, respectively. In both cases, the structures, with the aluminum and silicon regions electrically shorted, were subjected to irradiation with 10 kev. electrons, using a primary electron flux of approximately $10^{-5}$ coul per square centimeter. The broken curves illustrate the capacitance-voltage characteristics of the structures prior to irradiation; while the full curves illustrate the same characteristics after irradiation.

When MOS structures were bombarded with 10 kev. electrons, electrons with sufficient energy to penetrate the silicon surface were found to introduce positive charges in the oxide near the silicon surface, causing the capacitance-voltage curve to shift to the left as shown in FIG. 4B. The added charge is stable at room temperature in that successive capacitance-voltage characteristics requiring about 1 minute for measurement are identical over a measuring period of 10 minutes. The major portion of the added charge is independent of surface potential and does not involve mobile species. The amount of positive charge introduced, as deduced from image charge measurements in the silicon, can be as high as $2 \times 10^{12}$ charges per square centimeter, giving the result shown in FIG. 4B. The behavior of MNS structures toward electron radiation is quite different from that of MOS structures. Negative charge is introduced by the bombardment. Under conditions of zero bias, the amount of charge introduced is significantly less than in MOS structures. No more than $7 \times 10^{11}$ charges per square centimeter are introduced into the silicon nitride-silicon structure after bombardment with similar doses of electrons as shown in FIG. 4A.

Figure 5:
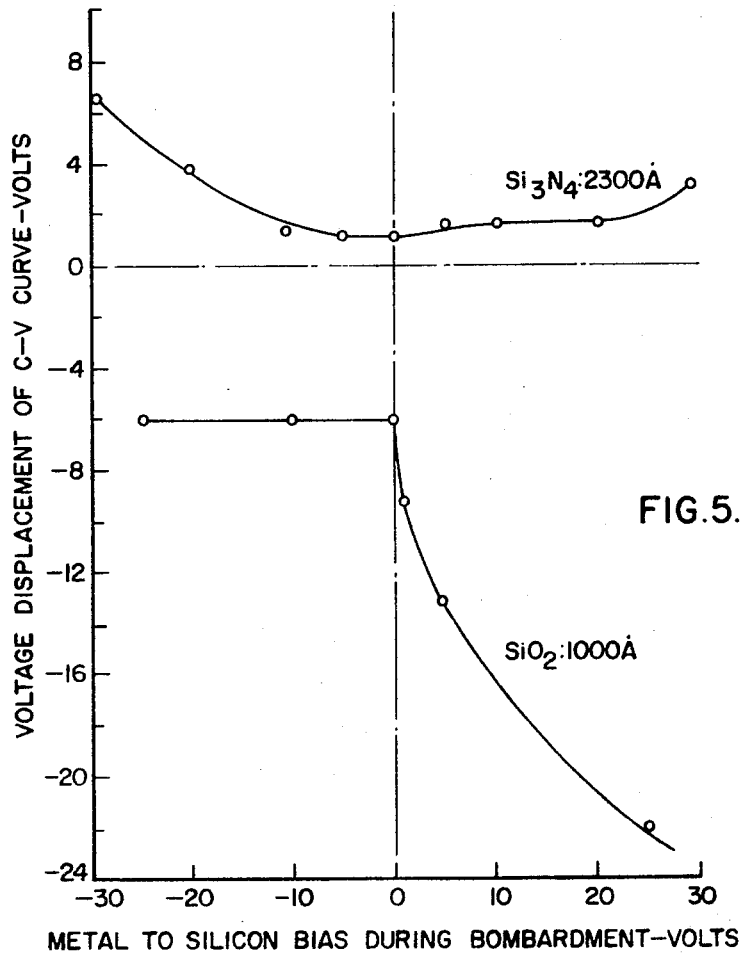
FIG. 5 is a graph illustrating the comparison of voltage shifts induced by irradiation under bias of capacitors employing silicon dioxide and silicon nitride insulating films, respectively.

In FIG. 5, a comparison of flat-band voltage shifts induced by radiation under bias is shown for capacitors having silicon dioxide and silicon nitride insulating layers. In both cases, the aluminum electrodes utilized in the measurements were of equal thickness. The nitride thickness and dielectric constant are such that the insulator capacitances are the same for the MOS and MNS units. Thus, the shifts in the flat-band voltage obtained from the capacitance-voltage curve, plotted on the vertical axis, are a valid comparison of charges introduced in the silicon-silicon dioxide and the silicon-silicon nitride structures. In the silicon dioxide case, a large shift is observed for zero and positive biases. With positive bias, the shift increases in an approximately parabolic manner. In the silicon nitride case, the shift is much smaller and is nearly constant in the $-15$ to $+15$ volt range of bias.

SUCCESSIVE LAYERS OF SILICON DIOXIDE AND SILICON NITRIDE

The charge instability of silicon nitride films can be rectified by first applying a thin layer of silicon dioxide to a silicon or other substrate before applying the silicon nitride film. For example, silicon dioxide films can be deposited on silicon substrates at 850° C. by the oxidation of silane in an argon atmosphere in a flow system. Subsequent to the deposition of about 30 to 150 Angstroms of the silicon dioxide film, the argon and oxygen flow is replaced by ammonia to deposit a silicon nitride film of approximately 1,000 Angstrom thickness.

Figure 6:
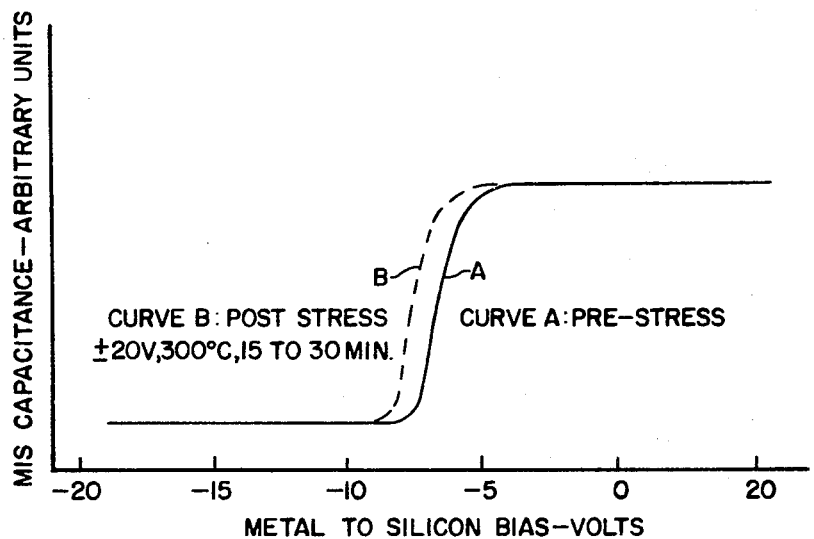
FIG. 6 is a graph illustrating the effect of a temperature-voltage stress on the capacitance-voltage behavior of a metal-silicon nitride-silicon dioxide-silicon structure.

A typical capacitance-voltage relation of a silicon-silicon dioxide-silicon nitride layer structure obtained in this manner, measured at room temperature, is shown by curve A in FIG. 6. It will be noted that these structures are stable under large voltage biases and do not exhibit the tunneling behavior discussed above with respect to MNS structures alone. Also, with silicon nitride layers of similar thickness, the negative flat-band voltage of metal-silicon nitride-silicon dioxide-silicon structures is lower than that of the corresponding structure with a silicon nitride layer alone as shown in FIG. 3.

The MNOS structures are also stable under bias-temperature stress as shown in FIG. 6. When stressed at 150° C. for periods of 5 minutes and longer, with fields of $2 \times 10^6$ volt-centimeter (in either direction through the insulator), the devices exhibit no change in their capacitance-voltage behavior. At 300° C., there is some charge re-arrangement but this is not pronounced. In FIG. 6, curve A is the prestressed reference curve. After a $-20$ volt bias for fifteen minutes at 300° C., the curve shifts by about 0.7 volt to curve B. Subsequent stress with $+20$ volts applied at 300° C. for 15 minutes involves less than 0.1 volt shift toward the reference curve. A repeat of the negative bias stress does not cause additional changes in the capacitance-voltage behavior.

Thus, the use of a thin oxide inter-layer in metal-silicon nitride-silicon structures reduces the flat-band voltage and also eliminates the charge instability phenomenon. For example, with a composite gate insulator using a silicon nitride layer of 1,000 Angstroms thickness, the flat-band voltages of MNOS structures are $-2.7$, $-3.6$, and $-4.0$ volts when the silicon dioxide layer is 35, 70, and 140 Angstroms, respectively. The thickness of the silicon dioxide layer should be in the range of 30 to 500 Angstroms. The thickness of the superposed silicon nitride layer is not critical, but for convenience in processing would probably be in the range of 500 to 1,000 Angstroms. In general, the thicknesses of both layers would be minimized for lower flat-band voltage.

Figure 7:
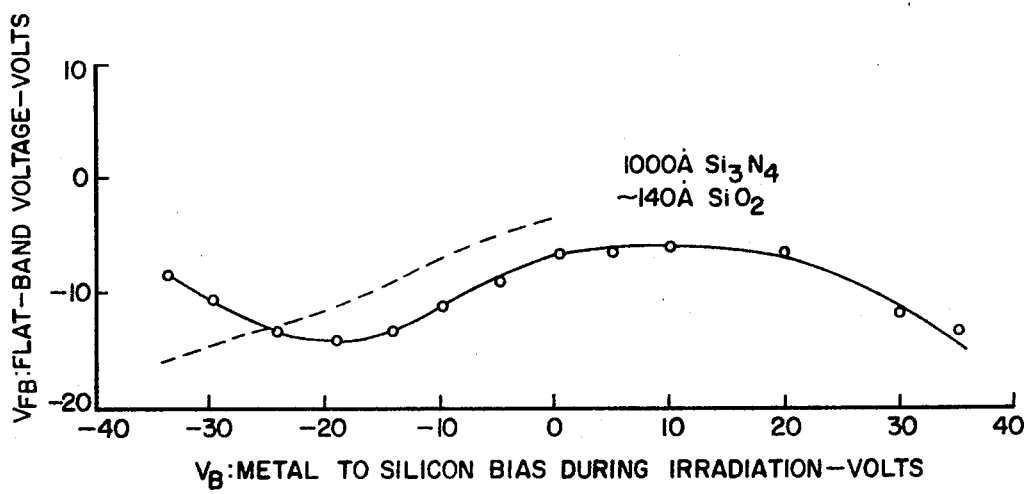
FIG. 7 is a graph illustrating the effect of 10 kev. electrons on the flat-band voltage of a metal-silicon nitride-silicon dioxide-silicon capacitor under different bias conditions.

The use of silicon dioxide inter-layer in MNS structures has no deleterious effect on the resistance of MNS structures toward electron irradiation. MNOS structures with a silicon dioxide layer is about 140 Angstroms thickness between the silicon nitride and the silicon were tested for radiation sensitivity. The silicon nitride was 1,000 Angstroms thick. Effects of irradiation with 10 kev. electrons were measured in terms of the flat-band voltage, $V_{FB}$, resulting after irradiation under a metal silicon bias $V_B$. In FIG. 7 these results are shown. For bias voltage during irradiation ranging from 0 to $+20$ v., the flat-band voltage remains nearly fixed, comparable to similar behavior for the MNS case shown in FIG. 5. For bias voltage ranging from 0 to $-35$ v. during irradiation the magnitude of the change in flat-band voltage is somewhat greater than for the MNS case. In comparison with the MOS case, the MNOS unit is much less sensitive overall to electron irradiation under bias. While somewhat more sensitive in this respect than the MNS units, the MNOS structure has the advantage of being free from the bias instability phenomena of MNS structures as illustrated in FIGS. 2B and 2C.

MIXTURES OF SILICON DIOXIDE AND SILICON NITRIDE AS DIELECTRIC COATINGS

Deposition of mixtures of silicon nitride and silicon dioxide on silicon substrates, for example, can be carried out in a gas flow system using a mixture of silane (or silicon tetrachloride), ammonia, and oxygen. Since the formation of silicon dioxide is kinetically and thermochemically more favorable than that of silicon nitride, a small fraction of oxygen in the reactant mixture is sufficient for the preparation of the mixture. A nitrogen-oxygen mixture containing 2 percent oxygen is used as the oxygen source so that a low flat rate of oxygen can be accurately measured.

Silicon nitride-silicon dioxide mixtures were deposited on N-type silicon substrates of 20–50 ohm-centimeter resistivity, with main faces of [111] orientation, at 900° C. During the deposition process, the flow rates of ammonia and silane were maintained at 40 liters per minute and 2 milliliters per minute, respectively, and the flow rate of oxygen was varied over a range of 1.0 to 100 milliliters per minute, corresponding to $NH_3/O_2$ mol ratios of $2 \times 10^4$ to $4 \times 10^2$. In some cases, the substrates were etched in situ using a hydrogen-hydrogen chloride mixture at 1,140° C. The thickness of the nitride-dioxide mixture obtained from 40 minutes of deposition and its dissolution in 2M hydrofluoric acid, as a function of oxygen concentration in the reactant mixture, are summarized in Table V:

TABLE V $Si_3N_4 + SiO_2$ Mixtures Deposited at 900° C. as a Function of Oxygen Flow Rate. Flow Rate of $NH_3 = 40$ l./min., Flow Rate of $SiH_4 = 2$ m l./min.

| Sample Number | Flow Rate of Oxygen, m l./min. | Film Thickness, Sodium Light Fringes | Time for Dissolution in 2M HF, min |
|---|---|---|---|
| 1 | 1 | 2.8 | 105 |
| 2 | 2 | 2.7 | 45.5 |
| 3 | 8 | 2.4 | 27.5 |
| 4 | 100 | 2.2 | 9.5 |

Note that as the flow rate of oxygen increases, the dissolution time in hydrofluoric acid decreases. The higher dissolution rate of mixtures of $SiO_2$ and $Si_3N_4$ is extremely useful in device fabrications.

Similar to silicon nitride and silicon dioxide films, films of mixtures of silicon nitride and silicon dioxide are also uniform, transparent, and highly adherent to the substrate. In spite of the large $NH_3/O_2$ mol ratios in the reactant mixture, oxygen is definitely incorporated into the film as can be shown by the infrared absorption spectra of the resulting film.

Capacitance-voltage measurements of several Si—($SiO_2$ + $Si_3N_4$) - Al diodes were taken for which the maximum positive bias was zero volts. The maximum negative bias was increased after each set of measurements and the flat-band voltage for each case noted. The results indicated the same type of instability behavior observed in the case of units with pure nitride films as noted above. However, Si—$SiO_2$—($SiO_2$ + $Si_3N_4$) structures are similar to Si—$SiO_2$—$Si_3N_4$ structures in that the addition of a thin oxide inter-layer has eliminated the charge instability problem. This fact and the higher dissolution rate of $Si_3N_4$ + $SiO_2$ mixtures indicate that the oxide and nitride mixtures are suitable for device purposes.

EXAMPLES OF DEVICES UTILIZING SILICON NITRIDE AND SILICON NITRIDE-SILICON DIOXIDE COMPOSITE DIELECTRIC FILMS

As one example, silicon nitride was used as the passivation dielectric and diffusion mask in the fabrication of planar junctions. In the initial experiments, silicon nitride films of approximately 1,000 Angstrom units thickness were deposited on N-type silicon substrates of 25–40 ohm-centimeter resistivity at 900° C. Regions of silicon nitride film of about one-quarter inch diameter were removed. Boron oxide was deposited in a two-step diffusion process. During the first step, boron oxide glass was deposited on the specimen surface at 1,100° C. for 1 hour. A diffused layer of about 3 microns depth with a surface concentration of $10^{20}$ atoms per cubic centimeter was formed in the unmasked regions of the specimen. The boron oxide glass was then removed by using aqueous hydrofluoric acid. After removal of the boron oxide, the specimens were heated in a nitrogen-steam atmosphere at 1,000° C. for 15 minutes to produce a thin oxide layer on the exposed silicon, and the "drive-in" step was carried out in a nitrogen atmosphere at 1,200° C. for 64 hours to yield a junction depth of about 40 microns. These junctions generally exhibited hard reverse characteristics with a breakdown voltage of about 600 volts; however, the best one showed a reverse voltage of about 800 volts with a leakage of less than 0.1 milliampere.

As another example, successive layers of silicon dioxide and silicon nitride were also used for the fabrication of planar junctions. A silicon dioxide film, 30 to 120 Angstrom units in thickness was first deposited on silicon substrates in an argon atmosphere prior to the deposition of silicon nitride. They were then processed in the same manner as described in the planar junction example given above. These junctions also support about 600 volts or higher.

Figure 8:
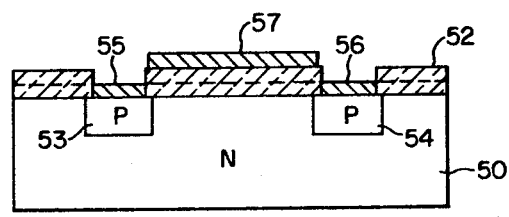
FIGS. 8 through 11 are cross-sectional views of various devices in accordance with the present invention.

FIG. 8 illustrates an insulated gate field effect transistor that may be made by the foregoing procedures. The N-type substrate 50 may be as described above with an insulator 52 that may be a single layer of silicon nitride but is preferably (as indicated by the dashed line dividing layer 52) a composite layer of a first layer portion adjacent the substrate of silicon dioxide and a subsequent layer portion of silicon nitride. P-type source and drain regions 53 and 54 are formed by selective diffusion in the substrate 50 and define a channel region therebetween. Source and drain contacts 55 and 56 are on regions 53 and 54, respectively, and gate electrode 57 is on insulating layer 52 over the channel region.

High voltage, high power devices have also been passivated by the use of silicon nitride and combinations of silicon nitride and silicon dioxide films. For example, diffused silicon wafers of PNP configuration having an N-type base of 0.005 to 0.006 inch thickness, and 20 to 25 ohm-centimeter resistivity, were used in the experiments. The P-type regions were formed by successive aluminum and gallium diffusions to a junction depth of about 0.003 inch. A groove of about three-quarter inch diameter was produced on one main face of the wafer by sandblasting to isolate the junction. In some cases, the periphery of the wafer was sandblasted at a shallow angle. The wafers were etched in a 15:5:3 $HNO_3$:$CH_3COOH$:HF mixture to remove mechanical damage, thoroughly rinsed in hot deionized, distilled water, and dried under a heat lamp. The reverse characteristics of the junction, usually 600 to 1300 volts at 1 milliamper at room temperature, were then determined at room temperature. Subsequently, the wafers were briefly etched, thoroughly rinsed, and placed on a susceptor in a quartz tube for the deposition of silicon nitride.

The conditions for the deposition of silicon nitride on the junction surfaces were those described above in connection with planar devices. That is, the substrate temperature was about 900° C., and the flow rates of silane and ammonia were 2 milliliters per minute and 40 liters per minute, respectively. The initial heating was carried out in an ammonia, argon, or hydrogen atmosphere. The thickness of the nitride film was usually 1000 Angstrom units. Subsequent to the deposition process, the reverse characteristics of the junctions were measured again at room temperature and at 120° C. In most cases where cleanliness precautions were exercised, the reverse characteristics at room temperature were found to remain the same after the deposition of the nitride film, irrespective of the initial heating process. The room temperature characteristics also remained the same after the specimens were immersed in a salt solution for 24 hours. However, the junction characteristics at 120° C. were found to be influenced by the initial heating process. The reverse currents of junctions which were heated initially in hydrogen or ammonia were found to increase rapidly with applied bias. Junctions heated initially in argon were found to be more stable at high temperature.

As still another example, field-effect transistors have been developed utilizing silicon nitride as the gate insulator. Insulated gate field-effect transistors were produced on 50 ohm-centimeter P-type silicon, using deposited films of silicon nitride as the insulator. Composite layers of silicon dioxide and silicon nitride were also used as insulators in a similar manner. Nitride films of approximately 1,000 Angstrom units thickness were deposited at 850° to 900° C.

In units with all nitride insulators, no ionic drift was observed. Furthermore, the polarization instability mechanism encountered with silicon nitride films in which the flatband voltage becomes more positive after large positive metalsilicon bias was just barely detectable in the case of nitride films deposited at 800° C.

By utilizing successive layers of silicon dioxide and silicon nitride, the temperature bias stress effects of insulated gate field-effect transistors utilizing silicon dioxide insulating films alone was eliminated. For example, 50 to 100 Angstrom units of silicon dioxide on an insulated gate field-effect transistor was subsequently covered by a layer of silicon nitride deposited at 900° C. There was no detectable change in device behavior due to stress.

Consequently, silicon nitride and silicon nitride-silicon dioxide double-layer insulators are highly useful for insulated gate field-effect transistor application. Under normal room temperature operating voltages, the units utilizing silicon nitride and a combination of silicon nitride and silicon dioxide as insulators are comparable to devices in which silicon dioxide is used. Under moderate stress (i.e., $10^6$ volts per centimeter at 150° C.) there is no evidence of ion migration in either type of structure. Polarization instability effects due to charge transfer across the silicon nitride-silicon interface and subsequent trapping in the nitride near the interface can be observed for the case where films alone are used. This, of course, can be anticipated from the discussion given above. This polarization, however, is suppressed by the inclusion of a thin silicon dioxide inner layer. This results in insulated gate field-effect transistors of superior resistance to bias-temperature stress. Such units show no effects to stress of 2 to $3 \times 10^6$ volts per centimeter at 200° to 300° C.

Figure 9:
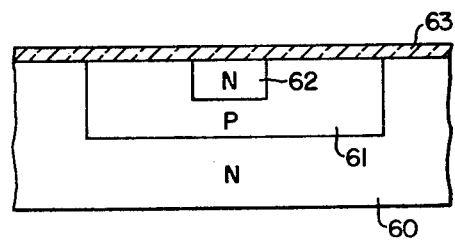
Figure 10:
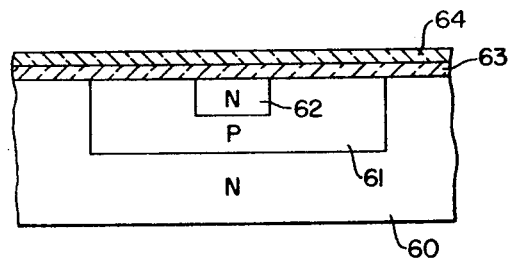

The above described benefits such as stability under bias-temperature stress and in radiation environments have been discussed primarily in terms of MIS structures as are necessarily formed in insulated-gate-field-effect-transistors. However, such benefits also occur in devices where an MIS structure incidentally occurs such as in so-called planar devices and integrated circuits. Such devices are processed through formation of desired semiconductive regions and P-N junctions, as shown in FIG. 9 where regions 61 and 62 have been formed with N-type region 60. A continuous insulating layer 63, typically thermally grown silicon dioxide of a thickness of about 3,000 Angstroms to 8,000 Angstroms or more occurs on the surface as a result of the well known selective diffusion and reoxidation technology. The layer 63 is usually not of uniform thickness but has steps as result from the different diffusion operations. It has been found that the deposition of a layer 64 (FIG. 10) of silicon nitride directly on the thermal oxide will seal a clean oxide from contaminants introduced during further handling and metallization. However, it may be preferable in some instances to remove previously grown or deposited oxide, particularly if contaminated with ionic species and deposit a clean film 63 of silicon dioxide as described hereinbefore which is then sealed, preferably in the same system, with a deposited layer 64 of silicon nitride. Since such devices would not generally exploit insulated gate field-effect transistor action, which may in fact be undesirable, the oxide layer thickness need not be limited to a maximum of 500 Angstroms. Thicknesses as great as those of presently used thermally grown oxide layers may be used, typically up to about 8,000 Angstroms. In this way capacitive effects of interconnecting leads disposed on the insulating layer are minimized.

Figure 11:
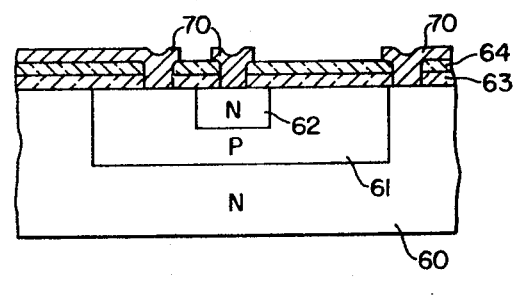

FIG. 11 shows a completed transistor that may be discrete or integrated utilizing oxide and nitride passivation layers 63 and 64 with contacts and interconnects 70 made to the various regions in the usual manner.

Although the invention has been shown in connection with certain specific examples, it will be readily apparent to those skilled in the art that various changes can be made to suit requirements without departing from the spirit and scope of the invention. In particular, it will be apparent that while silicon substrates have been exemplified in the preceding specification, other substrates can be used with equal effectiveness as, for example, in capacitor applications.

We claim:

1. In the process for producing a dielectric layer on the surface of a silicon substrate, the steps of heating the silicon substrate to a temperature in the range of about 650° to 1,300° C., and passing a stream of mixed unreacted gaseous compounds over the surface of the silicon substrate at a velocity of at least 8 centimeters per second whereby the compounds will react directly at the surface of the substrate to form a film containing silicon nitride, the mixed gases including ammonia and a compound selected from the group consisting of silane, the halosilanes and the silicon halides, the partial pressure of the gas selected from the group consisting of silane, the halosilanes and the silicon halides being less than 1% of the total gas pressure of said stream of mixed unreacted gases.

2. The process of claim 1 wherein said compound mixed with ammonia comprises silicon tetrachloride.

3. The process of claim 1 wherein said compound mixed with ammonia comprises silane.

4. The process of claim 1 wherein the temperature of the silicon substrate is in the range of 800° to 1,000° C.

5. The process of claim 1 wherein said mixed unreacted gaseous compounds are passed over the surface of the substrate only until the thickness of the silicon nitride film reaches a maximum thickness of 1 micron.

6. The process of claim 1 wherein hydrogen is included in said stream of mixed unreacted gaseous compounds.

7. The process of claim 1 wherein the compound reacted with ammonia comprises silicon tetrachloride and the substrate is disposed within a reaction chamber, and including the step of introducing the ammonia and silicon tetrachloride into the reaction chamber separately to prevent their reacting until they reach said surface of the substrate.

8. The process of claim 1 wherein the substrate is disposed within a closed reaction chamber, and including the step of performing an in situ etch on the surface of the substrate prior to passage of said mixture of unreacted gaseous compounds thereover.

* * * * *